United States Patent [19]

Uriu et al.

[11] Patent Number: 5,726,987
[45] Date of Patent: Mar. 10, 1998

[54] CONGESTION-MONITOR CONTROL APPARATUS AND SWITCHING SYSTEM

[75] Inventors: Shiro Uriu; Kenichi Okabe; Satoshi Kakuma, all of Kawasaki, Japan

[73] Assignee: Fujitsu Limited, Kanagawa, Japan

[21] Appl. No.: 621,804

[22] Filed: Mar. 22, 1996

[30] Foreign Application Priority Data

Jul. 13, 1995 [JP] Japan ................. 7-177166

[51] Int. Cl.⁶ ................................. H04L 12/28
[52] U.S. Cl. ................. 370/395; 370/230
[58] Field of Search ................. 370/229, 230, 370/235, 252, 234, 394, 395, 397, 399, 428; 395/200.64, 200.76; 340/825.5, 825.51

[56] References Cited

U.S. PATENT DOCUMENTS

| 5,090,011 | 2/1992 | Fukuta et al. | 370/230 |
| 5,179,556 | 1/1993 | Turner | 370/233 |
| 5,313,454 | 5/1994 | Bustini et al. | 370/231 |
| 5,335,222 | 8/1994 | Kamoi et al. | 370/230 |
| 5,583,858 | 12/1996 | Hanaoka | 370/392 |

FOREIGN PATENT DOCUMENTS 6-77987  3/1994  Japan ................. H04L 12/48

Primary Examiner—Douglas W. Olms
Assistant Examiner—A. Bnimoussa
Attorney, Agent, or Firm—Helfgott & Karas, P.C.

[57] ABSTRACT

A congestion-monitor control apparatus monitors a congestion condition of each output highway in an asynchronous transfer mode switching system transferring cells to output highways by using a cell-storage buffer. The apparatus includes a monitor circuit monitoring the number of cells stored in the cell-storage buffer for each output highway at a plurality of timings during a given monitor time interval. The apparatus further includes a first determination circuit comparing the number of times when the number of cells from the monitor circuit is equal to or more than a first threshold value during the given monitor time interval with a second threshold value and determining whether the congestion has occurred in a corresponding output highway based on a comparison result.

12 Claims, 4 Drawing Sheets

CONGESTION-MONITOR CONTROL APPARATUS AND SWITCHING SYSTEM

BACKGROUND OF THE INVENTION

1. Field of the Invention

The present invention generally relates to a congestion-monitor control apparatus and a switching system, and more particularly, to a congestion-monitor control apparatus and a switching system which monitor a congestion condition in an asynchronous transfer mode (ATM) switching system.

2. Description of the Related Art

FIG. 1 shows a configuration example of an asynchronous transfer mode (ATM) switching system using a shared buffer. In FIG. 1, symbols IHW0 to IHW3 respectively indicate input highways, and symbols OHW0 to OHW3 respectively indicate output highways. The ATM switching system includes a shared buffer 4 for switching cells (ATM cells) provided from the input highways IHW0 to IHW3 to the output highways OHW0 to OHW3, a header dropper 3 for deriving header information (which is referred to as a TAG) from the cells provided from the input highways IHW0 to IHW3, a write-into control circuit 1 for controlling writing of the cells provided from the input highways IHW0 to IHW3 into a given area of the shared buffer 4 based on the header information derived in the header dropper 3, and a read-out control circuit 2 for controlling reading of the cell written in the shared buffer 4 into a destination output highway.

The read-out control circuit 2 has a plurality of first-in, first-out (FIFO) memories corresponding to the output highways OHW0 to OHW3, and a selector SEL. When the cell is written in the shared buffer 4, its write-into address WA of the shared buffer 4 is written into the FIFO memory corresponding to the destination output highway. A selector SEL reads out the write-into address WA of each FIFO memory and supplies it as a read-out address RA to the shared buffer 4 at a given timing to read the cell to the output highway.

In the ATM switching system, when a switching operation is carried out by using the above-discussed shared buffer 4, a large number of cells unexpectedly flow into the shared buffer 4, and, as a result, congestion may be caused. Such congestion may easily occur when transmission paths are set between a plurality of input highways and one output highway.

When the congestion occurs, the congestion influences calls of other subscribers as well as calls of subscribers who transmitted the large number of cells, and may cause a loss of cells. Therefore, to prevent the congestion from occurring, it is necessary to control communication traffic. Accordingly, management of the congestion is required.

The congestion management may be carried out by monitoring a number of cells flowing into each output highway. The number of cells flowing into each output highway may be detected by monitoring the number of cells stored in the shared buffer 4 which will be transferred to the output highway. For a method of monitoring the number of cells stored in the shared buffer 4, a method of comparing the number of cells stored in the shared buffer 4 with a threshold value is proposed. In this method, when the number of cells stored in the shared buffer 4 exceeds the threshold value, it is determined that the congestion occurs, and, thus, congestion control is started.

In the congestion control, the cells are provided with a flag indicating that the switching system is in a congestion condition. This flag uses an explicit forward congestion indication (EFCI) bit in the header of the ATM cell. From the cells, a reception terminal for the cells may recognize that the received cells are transmitted from a transmission terminal through the switching system at the congestion condition. Then, the reception terminal informs the transmission terminal that congestion is occurring. When the transmission terminal recognizes the congestion occurrence, the transmission terminal reduces the number of cells to be transmitted (frequency band).

However, when the above-discussed method is used for monitoring the number of cells stored in the shared buffer 4, if the number of cells is close to the threshold value, a situation in which the number of cells exceeds the threshold value may frequently be caused, and, thus, the congestion control needs to frequently be started up for each situation.

SUMMARY OF THE INVENTION

It is an object of the present invention to provide a congestion-monitor control apparatus and a switching system which perform congestion control by stably and correctly determining a congestion occurrence, in which the disadvantages described above are eliminated.

The object described above is achieved by a congestion-monitor control apparatus for monitoring a congestion condition of each output highway in an asynchronous transfer mode switching system transferring cells to output highways by using a cell-storage buffer, the apparatus comprising: a monitor circuit monitoring the number of cells stored in the cell-storage buffer for each output highway at a plurality of timings during a given monitor time interval; and a first determination circuit comparing the number of times when the number of cells from the monitor circuit is equal to or more than a first threshold value during the given monitor time interval with a second threshold value and determining whether the congestion has occurred in a corresponding output highway based on a comparison result.

According to the above-mentioned congestion-monitor control apparatus, the congestion occurrence in the buffer is not determined solely by the number of cells at one timing, but, the number of cells are compared with the first threshold value at the plurality of timings and the congestion occurrence may be determined when the number of times when the number of cells is equal to or more than the first threshold value in the given monitor time interval is more than the second threshold value.

Therefore, whether the congestion occurs may stably and correctly be monitored.

The object described above is also achieved by the apparatus mentioned above, wherein the apparatus further comprises a second determination circuit comparing the number of times when the number of cells from the monitor circuit is under a third threshold value during the given monitor time interval with a fourth threshold value and determining whether the congestion which occurred in the corresponding output highway is ended based on a comparison result.

According to the above-mentioned apparatus, when the third threshold value is set to less than the first threshold value, hysteresis characteristics are provided between determination of the congestion occurrence and determination of the congestion release. Therefore, after the congestion which occurred is completely ended, the congestion release may be determined. Further, since the fourth threshold value is provided, the congestion release may further stably be determined.

The object described above is also achieved by the apparatus mentioned above, wherein comparing and determining operations of the determination circuit are carried out after a traffic control is carried out to remove the congestion.

The object described above is also achieved by the apparatus mentioned above, wherein: the monitor circuit comprises a cell counter counting the number of cells stored in the cell-storage buffer for each output highway; the first determination circuit comprises: a first counter counting the number of times when the number of cells from the cell counter is equal to or more than the first threshold value during the given monitor time interval; and a congestion-occurrence determination circuit comparing the number of times from the first counter with the second threshold value and determining whether the congestion has occurred in the corresponding output highway based on a comparison result; and the second determination circuit comprises: a second counter counting the number of times when the number of cells from the cell counter is under the third threshold value during the given monitor time interval; and a congestion-release determination circuit comparing the number of times from the second counter with the fourth threshold value and determining whether the congestion which occurred in the corresponding output highway is ended based on a comparison result.

According to the above-mentioned apparatus, the apparatus may be constructed with hardware to independently control a monitor operation. Therefore, the monitor operation control may be performed without using a calculating process based on monitoring of an amount of traffic by firmware or software.

The object described above is also achieved by a congestion-monitor control apparatus for monitoring a congestion condition of each service class in an asynchronous transfer mode switching system transferring cells of a plurality of service classes by using a cell-storage buffer, the apparatus comprising: a monitor circuit monitoring the number of cells stored in the cell-storage buffer for each service class at a plurality of timings during a given monitor time interval; and a first determination circuit comparing the number of times when the number of cells from the monitor circuit is equal to or more than a first threshold value during the given monitor time interval with a second threshold value and determining whether the congestion has occurred in a corresponding service class based on a comparison result.

The object described above is also achieved by the apparatus mentioned above, wherein the apparatus further comprises a second determination circuit comparing the number of times when the number of cells from the monitor circuit is under a third threshold value during the given monitor time interval with a fourth threshold value and determining whether the congestion which occurred in the corresponding service class is ended based on a comparison result.

According to the above-mentioned apparatus, for each service call, congestion occurrence may stably be monitored.

The object described above is also achieved by a congestion-monitor control apparatus for monitoring a congestion condition of each output highway and each service class in an asynchronous transfer mode switching system transferring cells of a plurality of service classes to output highways by using a cell-storage buffer, the apparatus comprising: a monitor circuit monitoring the number of cells stored in the cell-storage buffer for each output highway and each service class at a plurality of timings during a given monitor time interval; and a first determination circuit comparing the number of times when the number of cells from the monitor circuit is equal to or more than a first threshold value during the given monitor time interval with a second threshold value and determining whether the congestion has occurred in corresponding output highway and service class based on a comparison result.

The object described above is also achieved by the apparatus mentioned above, wherein the apparatus further comprises a second determination circuit comparing the number of times when the number of cells from the monitor circuit is under a third threshold value during the given monitor time interval with a fourth threshold value and determining whether the congestion which occurred in the corresponding output highway and service class is ended based on a comparison result.

According to the above-mentioned apparatus, for each output highway and each service class, the congestion occurrence may stably be monitored.

Other objects and further features of the present invention will be apparent from the following detailed description when read in conjunction with the accompanying drawings.

DESCRIPTION OF THE PREFERRED EMBODIMENTS

Figure 1:
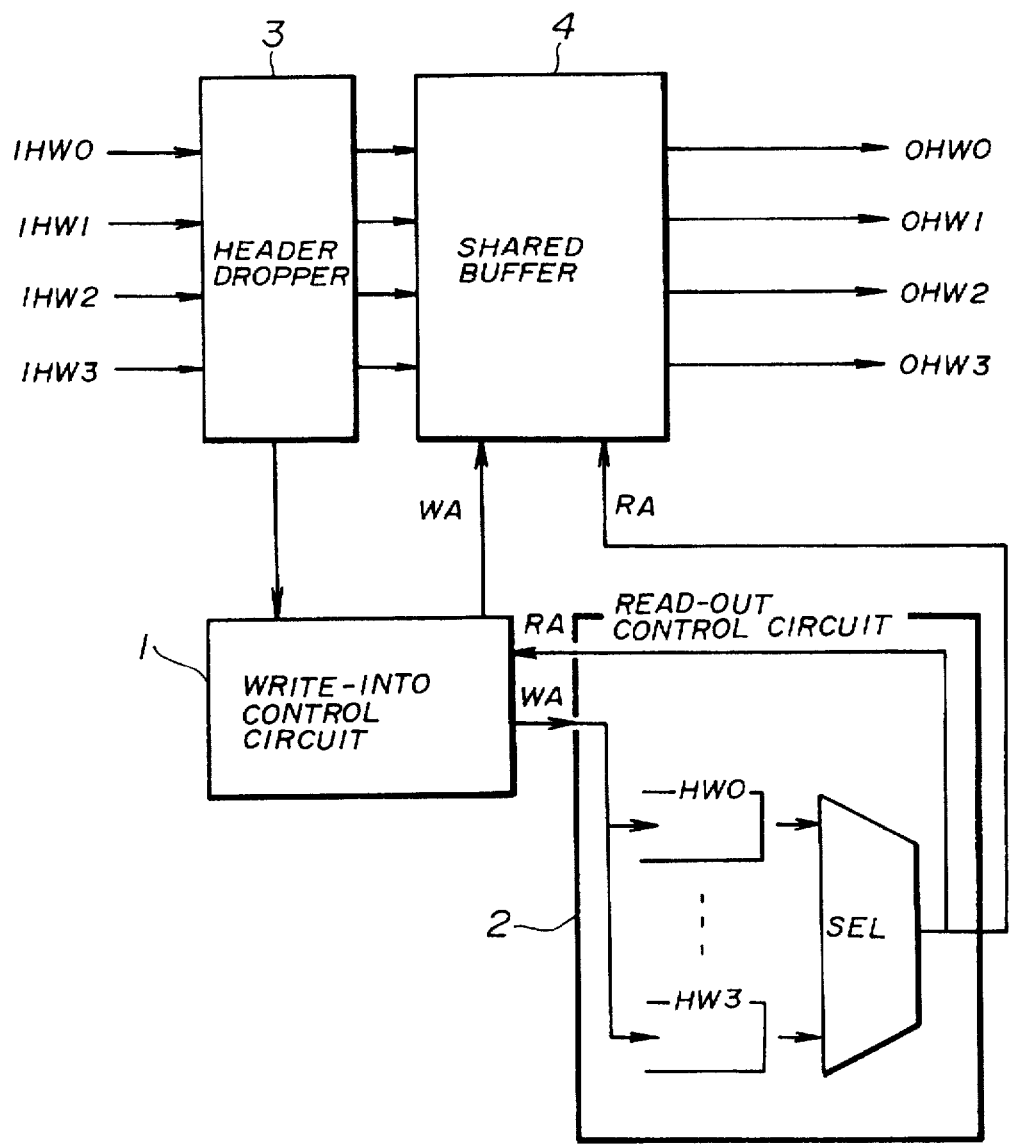
FIG. 1 shows a configuration example of an asynchronous transfer mode (ATM) switching system using a shared buffer.

First, a description will be given of an embodiment of a congestion-monitor control apparatus according to the present invention, by referring to FIG. 1 and FIG. 2. In the following description, the present invention is applied to the ATM switching system using the shared buffer shown in FIG. 1. In a congestion-monitor control circuit provided in the write-into control circuit 1 of the ATM switching system, the following congestion control according to the present invention is performed.

Figure 2:
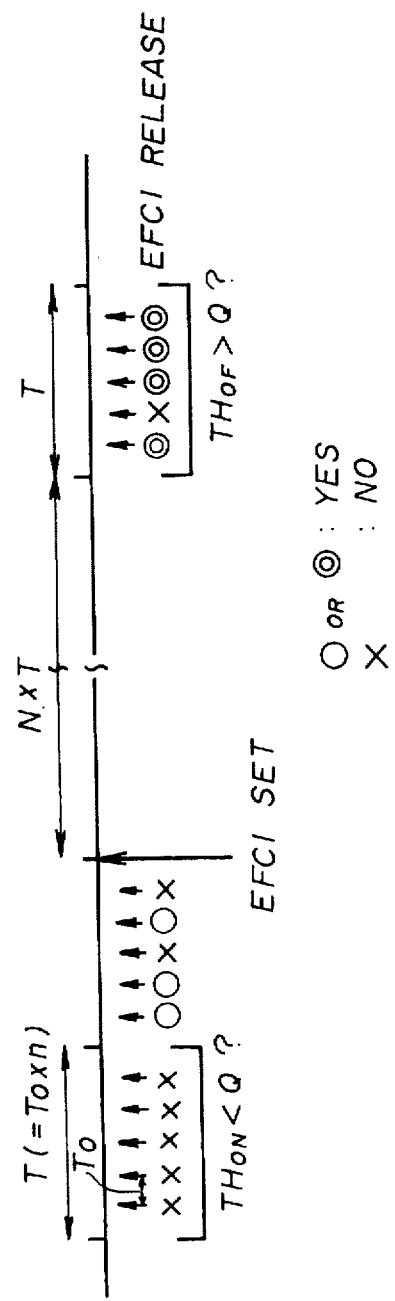
FIG. 2 shows an illustration for explaining an operation concept of a congestion control according to the present invention.

FIG. 2 shows an illustration for explaining an operation concept of the congestion control according to the present invention. In the congestion control according to the present invention, determination of whether or not the congestion in the shared buffer 4 has occurred is not based solely on the number of cells at one instance of time. Namely, if a large number of cells which may cause the congestion are not stored in the shared buffer 4 for a given time period, it is determined that congestion has not occurred.

Therefore, in this embodiment, the number of cells stored in the shared buffer 4 is monitored every sampling time period in a specified monitor time interval T which is n times the sampling time period. The congestion is determined based on a number of samplings in which the number of cells exceeds the threshold value $TH_{ON}$. The sampling time period is set to be equal to a time period of a write-into timing for writing the cell into the shared buffer 4. Further, every time a write-into frame (which is generated every sampling time period) is transmitted, the number of cells stored in the shared buffer 4 is monitored for each output highway.

In this embodiment, the following parameters are set for the congestion control.

(1) $T_{HON}$: a threshold value in each sampling time period for determining whether to set the EFCI bit;

(2) $TH_{OF}$: a threshold value in each sampling time period for determining whether to release the set EFCI bit;

(3) $T_0$: a sampling time period (cell-write-into frame time period in this embodiment);

(4) $T=nT_0$: a specified monitor time interval (the time is determined by n);

(5) $T_W=NT$: a waiting time after the EFCI bit is set (the time is determined by N);

(6) $TH_E$: a threshold value for comparing with the number of times when the number of cells exceeds the threshold value $TH_{ON}$ during the specified monitor time interval T (the threshold value is referred to as an EFCI-set threshold value); and (7) $TH_D$: a threshold value for comparing with the number of times when the number of cells exceeds the threshold value $TH_{OF}$ during the specified monitor time interval T (the threshold value is referred to as an EFCI-release threshold value).

In the embodiment shown in FIG. 2, the EFCI-set threshold value $TH_E$ is set to 3, and the EFCI-release threshold value $TH_D$ is set to 3.

In the congestion-monitor control circuit of the write-into control circuit 1, for each output highway OHW0 to OHW3, every sampling time period $T_0$ (1 cell time), the number Q of cells transferred from the shared buffer 4 to the output highway is monitored, and the number Q of cells is compared with the threshold value $TH_{ON}$. Through the n comparisons over the specified monitor time interval T, the number of times when the number of cells Q exceeds the threshold value $TH_{ON}$ are counted.

In the embodiment shown in FIG. 2, a symbol "○" indicates a sampling time period when the number of cells Q exceeds the threshold value $TH_{ON}$, and a symbol "x" indicates a sampling time period when the number of cells Q does not exceed the threshold value $TH_{ON}$. In this embodiment, the number of sampling time periods when the number of cells Q exceeds the threshold value $TH_{ON}$ during a second monitor time interval T is 3.

When the counted value of the number of times when the number of cells exceeds the threshold value $TH_{ON}$ during the specified monitor time interval T is equal to or more than the EFCI-set threshold value $TH_E$, it is determined that the congestion occurs in the output highway. And, thus, for that output highway after that monitor time interval, the EFCI bit is set to that header.

When the EFCI bit is set, both a transmission terminal and a reception terminal in the end-to-end system may be informed of the congestion occurrence. As a result, the transmission terminal reduces the number of transmission cells and controls the frequency band (band control) to cancel the congestion condition.

Once the EFCI bit is set, the congestion-monitor control circuit waits for the waiting time $T_W$ until the transmission terminal carries on the band control. The waiting time $T_W$ is set by an equation $T_W=T \times N$.

After the congestion-monitor control circuit waits for the waiting time $T_W$, monitoring of the number of cells Q stored in the shared buffer 4 starts again. In this case, the monitored number of cells Q is compared with the threshold value $TH_{OF}$, and the number of times when the number of cells Q does not exceed the threshold value $TH_{OF}$ is counted for the specified monitor time interval T. In the embodiment shown in FIG. 2, a symbol "⊙" indicates a sampling time period when the number of cells Q does not exceed the threshold value $TH_{OF}$, and a symbol "x" indicates a sampling time period when the number of cells Q exceeds the threshold value $TH_{OF}$.

In the monitor time interval T after the monitoring of the number of cells Q is restarted, the number of cells Q is monitored again every sampling time period (total of n times). In this case, when the counted value of the sampling time periods when the number of cells Q does not exceed the threshold value $TH_{OF}$ is more than the EFCI-release threshold value $TH_D$, the set of the EFCI bit in the cell header is released after the next monitor time interval. In the embodiment shown in FIG. 2, the number of the sampling time periods when the number of cells Q does not exceed the threshold value $TH_{OF}$ is 4. Since the EFCI-release threshold value $TH_D$ is set to 3, the set of the EFCI bit is released as shown in FIG. 2.

On the other hand, when the number of sampling time periods when the number of cells Q does not exceed the threshold value $TH_{OF}$ is not more than the EFCI-release threshold value $TH_D$, the same monitoring process is carried out also in the next monitor time interval T. The monitoring process is continued until the EFCI bit is released. After the EFCI bit is released, the previously discussed comparing operation of the number of cells Q and the threshold value $TH_{ON}$ for determining the congestion occurrence starts again.

Figure 3:
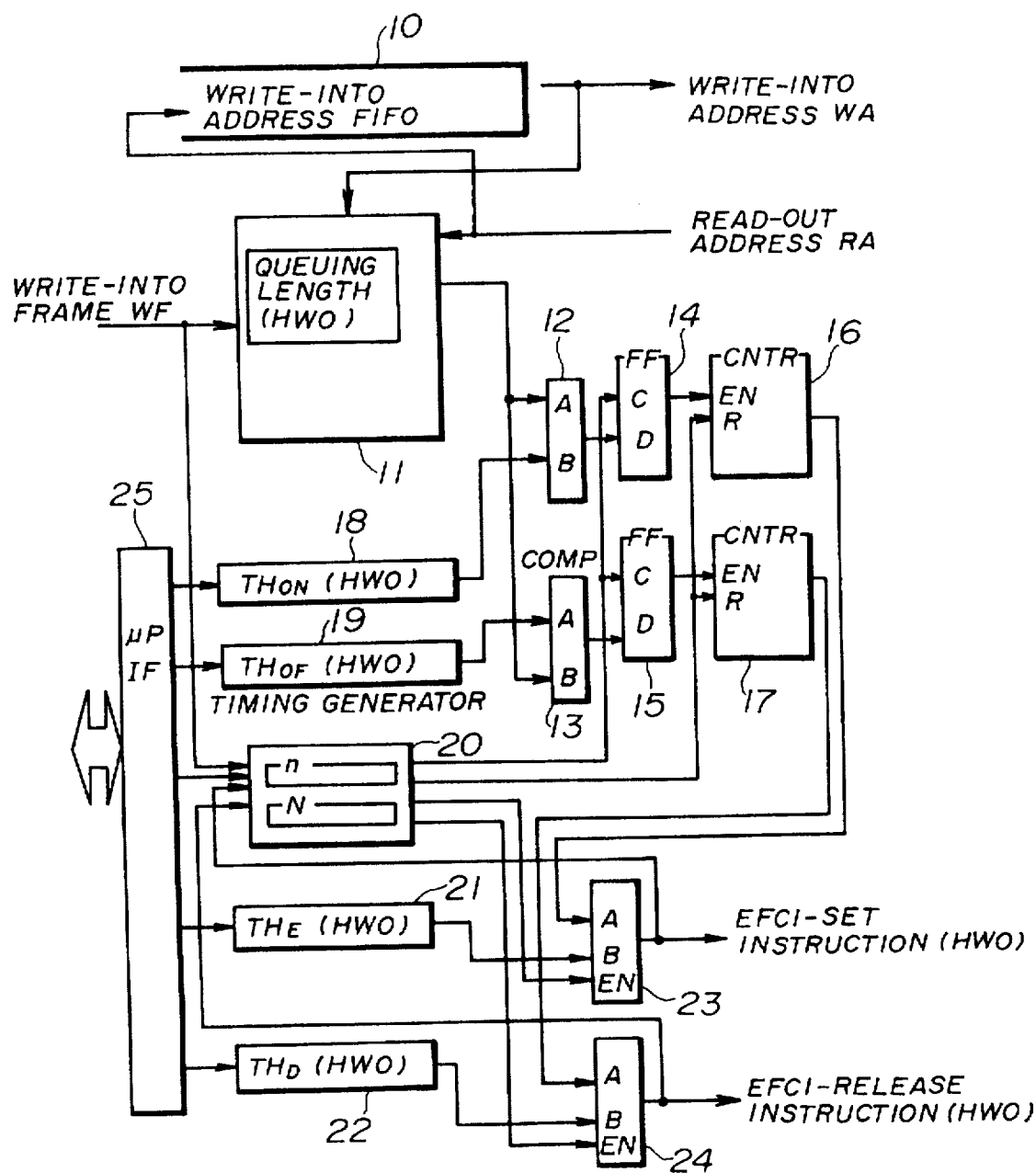
FIG. 3 shows a detail configuration example of a congestion-monitor control circuit.

FIG. 3 shows a detail configuration example of the congestion-monitor control circuit. Though the congestion-monitor control circuit is commonly provided for each output highway OHW0 to OHW3, to simplify the description, only one congestion-monitor control circuit for the output highway OHW0 is represented.

The congestion-monitor control circuit includes a FIFO memory 10 for storing the write-into addresses used in the write-into control circuit 1. The FIFO memory 10 stores unused write-into addresses (indicating available memory areas) of a plurality of write-into addresses to be used for the output highway OHW0 in the shared buffer 4. Further, to the FIFO memory 10, a read-out address RA for the output highway OHW0 is provided from the read-out control circuit 2. Namely, the read-out address RA which has been used for reading the cell from the shared buffer 4 is provided and stored again in the FIFO memory 10 as the unused write-into address WA.

The congestion-monitor control circuit further includes a counter 11 for counting the number of cells $Q_0$ transferred from the shared buffer 4 to the output highway OHW0. The counter 11 is provided with a write-into frame pulse WF generated every time one cell is input, header information HD derived in the header dropper 3, the read-out address RA transmitted from the read-out control circuit 2 toward the output highway OHW0, and the write-into address WA from the FIFO memory 10.

In the counter 11, when it is determined that the input write-into frame pulse WF is used for a cell being directed to the output highway OHW0 based on the input header information, a count number is increased by one. When the read-out address RA toward the output highway OHW0 is received from the read-out control circuit 2, the count number is decreased by one. The count number is held as a queuing length of the output highway OHW0. The input write-into address WA provided from the FIFO memory 10 is used for confirmation in a case of incrementing the count number.

The congestion-monitor control circuit further includes threshold-value storage circuits 18, 19, 21, 22 for respectively storing the threshold values $TH_{ON}$, $TH_{OF}$, $TH_E$, $TH_D$ in relation to the output highway OHW0. These threshold values are transferred from a processor side (not shown) through a processor interface 25.

In the congestion-monitor control circuit shown in FIG. 3, a timing generator 20 generates a timing signal for a variety of circuits in the congestion-monitor control circuit. In the timing generator 20, the value n for determining the monitor time interval T (=$T_0 \times n$), and the value N for determining the waiting time $T_W$ (=$T \times N$) are set. Further, to the timing generator 20, the write-into frame pulse WF, and an EFCI-set instruction signal and an EFCI-release instruction signal for the output highway OHW0 are provided. Based on these parameters and signals, the timing signal is generated.

Further, comparators 12, 13 are provided with the count number $Q_O$ from the counter 11 and the threshold values $TH_{ON}$, $TH_{OF}$ from the threshold-value storage circuits 18, 19 as comparison references. The comparator 12 compares the count number $Q_0$ with the threshold value $TH_{ON}$ for determining whether the congestion occurred. The comparator 13 compares the count number $Q_0$ with the threshold value $TH_{OF}$ for determining whether the congestion has ended.

Flip-flop circuits 14, 15 respectively store and produce the comparison results of the comparators 12, 13 every sampling time period $T_0$. Counters 16, 17 respectively count outputs of the flip-flop circuits 14, 15. The counter 16 counts the number of times when the counted number $Q_0$ at each sampling time period exceeds the threshold value $TH_{ON}$ over the one monitor time interval T for determining whether the congestion occurred. The counter 17 counts the number of times when the counted number $Q_0$ at each sampling time period is under the threshold value $TH_{OF}$ over the one monitor time interval T for determining whether the congestion has ended. These counted numbers in the counters 16, 17 are reset by the timing signal generated in the timing generator 20 at an end of the monitor time interval T.

Furthermore, comparators 23, 24 respectively compare the counted numbers from the counters 16, 17 with the threshold values $TH_E$, $TH_D$ stored in the threshold-value storage circuits 21, 22. According to comparison results, the comparator 23 produces the EFCI-set instruction for the output highway OHW0, and the comparator 24 produces the EFCI-release instruction for the output highway OHW0.

The comparator 23 is enabled to operate by an enable signal EN produced from the timing generator 20 in the monitor time interval T for the EFCI set. The comparator 24 is enabled to operate by the enable signal EN produced from the timing generator in the monitor time interval T for the EFCI release.

In the following, a description will be given of an operation of the congestion-monitor control circuit. In the counter 11, every time the cell going to the output highway OHW0 is written into the shared buffer 4, the counted number is increased by one, and every time the cell going to the output highway OHW0 is read out from the shared buffer 4, the counted number is decreased by one. Therefore, the counter 11 may count the number $Q_0$ of the cells going to the output highway OHW0 which are currently stored in the shared buffer 4.

This counted number $Q_0$ is compared with the threshold values $TH_{ON}$, $TH_{OF}$ in the comparators 12, 13. As a result, in the counter 16, the number of times when the counted number $Q_0$ exceeds the threshold value $TH_{ON}$ over the monitor time interval T is counted, and is reset at each end of the monitor time interval T. The counted number in the counter 16 is compared with the threshold value $TH_E$ in the comparator 23. When the counted number in the counter 16 is equal to or more than the threshold value $TH_E$, it is determined that the congestion occurs in the output highway OHW0, and, the comparator 23 produces the EFCI-set instruction.

In the same way, in the counter 17, the number of times when the counted number $Q_0$ is under the threshold value $TH_{OF}$ over the monitor time interval T is counted, and is reset at each end of the monitor time interval T. The counted number in the counter 17 is compared with the threshold value $TH_D$ in the comparator 24. When the counted number in the counter 17 is equal to or more than the threshold value $TH_D$, it is determined that the congestion which occurred in the output highway OHW0 is ended, and, the comparator 24 produces the EFCI-release instruction.

The present invention is applicable in a variety of modified manners. For example, though the above-discussed process is carried out in every output highway, the following manner is applicable.

The calls through the ATM switching system are classified into a plurality of classes according to the traffic condition. Theses classes are called service classes. In one of the service classes, service quality of the calls are the same, the service quality being defined for each class by a cell loss, a cell speed, a transmission delay, dispersion of delay, etc.

In the shared buffer, the calls belonging to the plurality of service classes are simultaneously stored. When the congestion occurs, if the calls belonging to one service class have no influence on the residual service classes, abandonment of the cells due to congestion does not occur in the output highway. Therefore, when the previously-discussed starting-up and ending processes of the congestion control are carried out by monitoring the number of the cells for each service class, the congestion control is operable. In this case, the EFCI-setting process may be carried out for each service class as well as for the output highway. At this time, the threshold values are also set for each service class. To which service class each cell belongs is defined in a tag (TAG) field.

Figure 4:
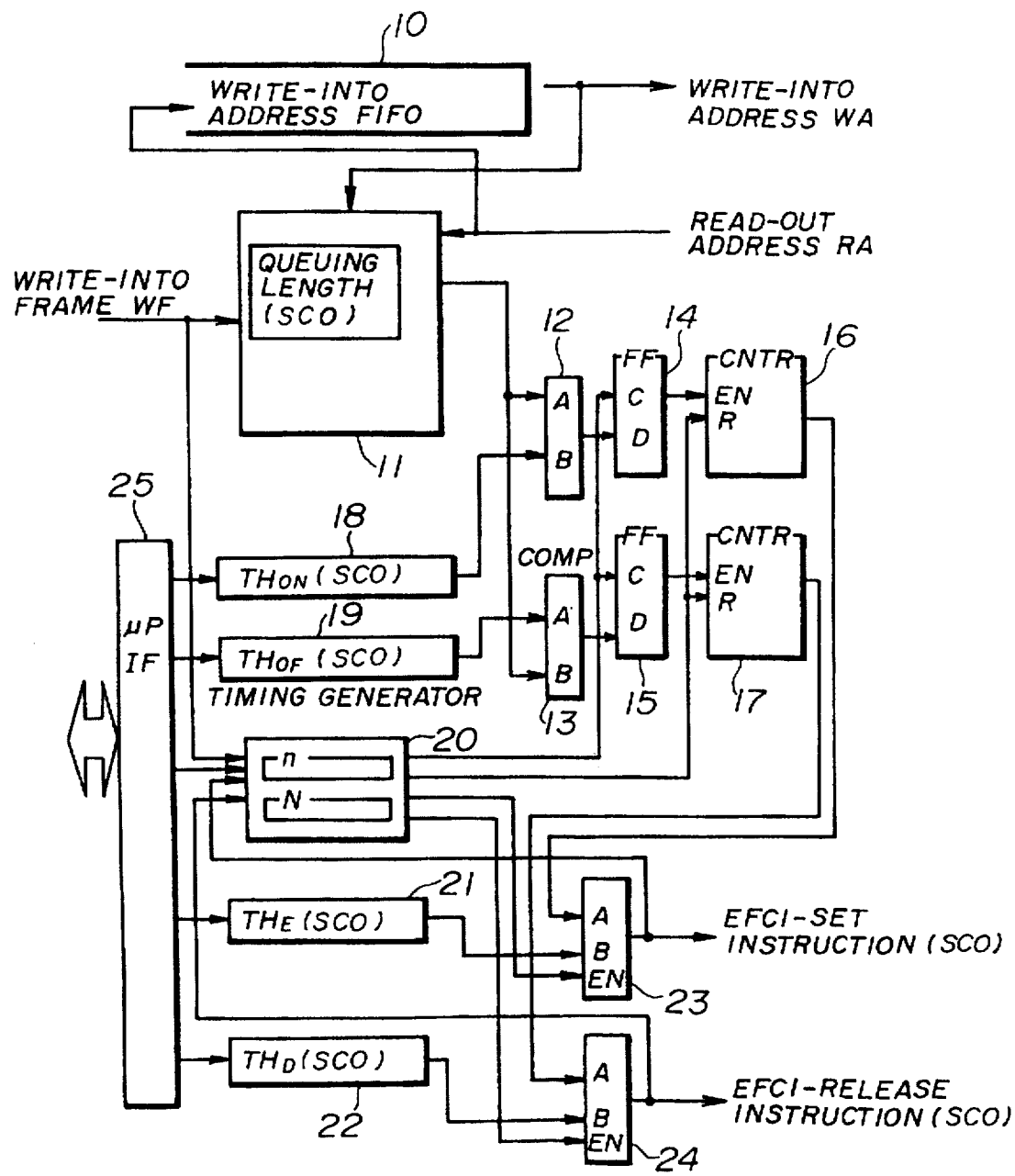
FIG. 4 shows a configuration example of the congestion-monitor control circuit monitoring the congestion for each service class.

FIG. 4 shows a configuration example of the congestion-monitor control circuit monitoring the congestion for each service class. The congestion-monitor control circuit shown in FIG. 4 has the same hardware construction as that of the previously-discussed embodiment shown in FIG. 3. However, the congestion-monitor control circuit shown in FIG. 4 is provided for each service class. The counter 11 counts the number of cells for the corresponding service class, and the threshold-value storage circuits 18, 19, 21, 22 respectively store the threshold values $TH_{ON}$, $TH_{OF}$, $TH_E$, $TH_D$ for the corresponding service class.

The above-discussed embodiments may monitor the congestion for each output highway or each service class. However, the congestion-monitor control circuit according to the present invention may be constructed so as to monitor the congestion for each service class in addition to monitor the congestion for each output highway.

As described above, the present inventions have the following features.

According to the present invention, whether the congestion occurs may stably and correctly be monitored. Further, without using a calculating process based on the monitoring of the amount of traffic by firmware or software, the control operation may independently be carried out by using hardware. Therefore, it is possible to rapidly process the current condition, and the congestion condition may be prevented from occurring without a delay time. Accordingly, the congestion is prevented from influencing the calls belonging to the switching system.

Further, the present invention is not limited to these embodiments, but other variations and modifications may be made without departing from the scope of the present invention.

What is claimed is:

1. A congestion-monitor control apparatus for monitoring a congestion condition of each output highway in an asynchronous transfer mode switching system transferring cells to output highways by using a cell-storage buffer, said apparatus comprising:

a monitor circuit monitoring the number of cells stored in said cell-storage buffer for each output highway at a plurality of timings during a given monitor time interval; and a first determination circuit comparing the number of times when the number of cells from said monitor circuit is equal to or more than a first threshold value during said given monitor time interval with a second threshold value and determining whether congestion has occurred in a corresponding output highway based on a comparison result.

2. The apparatus as claimed in claim 1, wherein said apparatus further comprises a second determination circuit comparing the number of times when the number of cells from said monitor circuit is under a third threshold value during said given monitor time interval with a fourth threshold value and determining whether the congestion which occurred in the corresponding output highway is ended based on a comparison result.

3. The apparatus as claimed in claim 2, wherein said determination circuit carries out the comparing and determining operations after a traffic control is carried out to remove the congestion.

4. The apparatus as claimed in claim 2, wherein:

said monitor circuit comprises a cell counter counting the number of cells stored in said cell-storage buffer for each output highway;

said first determination circuit comprises:

a first counter counting the number of times when the number of cells from said cell counter is equal to or more than said first threshold value during said given monitor time interval; and a congestion-occurrence determination circuit comparing said number of times from said first counter with said second threshold value and determining whether the congestion has occurred in the corresponding output highway based on a comparison result; and said second determination circuit comprises:

a second counter counting the number of times when the number of cells from said cell counter is under said third threshold value during said given monitor time interval; and a congestion-release determination circuit comparing said number of times from said second counter with said fourth threshold value and determining whether the congestion which occurred in the corresponding output highway is ended based on a comparison result.

5. A congestion-monitor control apparatus for monitoring a congestion condition of each service class in an asynchronous transfer mode switching system transferring cells of a plurality of service classes by using a cell-storage buffer, said apparatus comprising:

a monitor circuit monitoring the number of cells stored in said cell-storage buffer for each service class at a plurality of timings during a given monitor time interval; and a first determination circuit comparing the number of times when the number of cells from said monitor circuit is equal to or more than a first threshold value during said given monitor time interval with a second threshold value and determining whether the congestion has occurred in a corresponding service class based on a comparison result.

6. The apparatus as claimed in claim 5, wherein said apparatus further comprises a second determination circuit comparing the number of times when the number of cells from said monitor circuit is under a third threshold value during said given monitor time interval with a fourth threshold value and determining whether the congestion which occurred in the corresponding service class is ended based on a comparison result.

7. The apparatus as claimed in claim 6, wherein said second determination circuit carries out the comparing and determining operations after a traffic control is carried out to remove the congestion.

8. The apparatus as claimed in claim 6, wherein:

said monitor circuit comprises a cell counter counting the number of cells stored in said cell-storage buffer for each service class;

said first determination circuit comprises:

a first counter counting the number of times when the number of cells from said cell counter is equal to or more than said first threshold value during said given monitor time interval; and a congestion-occurrence determination circuit comparing said number of times from said first counter with said second threshold value and determining whether the congestion has occurred in the corresponding service class based on a comparison result; and said second determination circuit comprises:

a second counter counting the number of times when the number of cells from said cell counter is under said third threshold value during said given monitor time interval; and a congestion-release determination circuit comparing said number of times from said second counter with said fourth threshold value and determining whether the congestion which occurred in the corresponding service class is ended based on a comparison result.

9. A congestion-monitor control apparatus for monitoring a congestion condition of each output highway and each service class in an asynchronous transfer mode switching system transferring cells of a plurality of service classes to output highways by using a cell-storage buffer, said apparatus comprising:

a monitor circuit monitoring the number of cells stored in said cell-storage buffer for each output highway and each service class at a plurality of timings during a given monitor time interval; and a first determination circuit comparing the number of times when the number of cells from said monitor circuit is equal to or more than a first threshold value during said given monitor time interval with a second threshold value and determining whether the congestion has occurred in corresponding output highway and service class based on a comparison result.

10. The apparatus as claimed in claim 9, wherein said apparatus further comprises a second determination circuit comparing the number of times when the number of cells from said monitor circuit is under a third threshold value during said given monitor time interval with a fourth threshold value and determining whether the congestion which occurred in the corresponding output highway and service class is ended based on a comparison result.

11. A switching system transferring cells of a plurality of service classes from input highways to output highways, said switching system comprising:

a shared buffer storing the cells;

a writing control circuit writing the cells provided from said input highways to said shared buffer;

a reading control circuit reading the cells stored in said shared buffer to said output highways; and a congestion-monitor control apparatus monitoring a congestion condition for one of each output highway and each service class, said apparatus including:

a monitor circuit monitoring the number of cells stored in said cell-storage buffer for one of each output highway and each service class at a plurality of timings during a given monitor time interval; and a first determination circuit comparing the number of times when the number of cells from said monitor circuit is equal to or more than a first threshold value during said given monitor time interval with a second threshold value and determining whether congestion has occurred in corresponding output highway and service class based on a comparison result.

12. The switching system as claimed in claim 11, wherein said congestion-monitor control apparatus further comprises a second determination circuit comparing the number of times when the number of cells from said monitor circuit is under a third threshold value during said given monitor time interval with a fourth threshold value and determining whether the congestion which occurred in the corresponding output highway and service class is ended based on a comparison result.

\* \* \* \* \*